United States Patent [19]
Trompf et al.

[11] Patent Number: 5,949,367
[45] Date of Patent: Sep. 7, 1999

[54] DEVICE AND METHOD FOR CLASSIFYING OBJECTS IN AN ENVIRONMENTALLY ADAPTIVE MANNER

[75] Inventors: Michael Trompf, Hemmingen; Hans Jürgen Matt, Remseck; Dieter Baums, Giessen; Gebhard Thierer, Ditzingen, all of Germany

[73] Assignee: Alcatel Alsthom Compagnie Generale d'Electricite, Paris, France

[21] Appl. No.: 09/023,781

[22] Filed: Feb. 13, 1998

[30] Foreign Application Priority Data

Feb. 20, 1997 [DE] Germany .......................... 197 06 576

[51] Int. Cl.⁶ .................................................. G01S 7/41
[52] U.S. Cl. ........................ 342/90; 364/148.03; 382/156
[58] Field of Search ................ 342/26, 90, 175, 342/192, 194, 195, 196, 197; 364/148.03; 382/156; 706/2, 6, 15

[56] References Cited

U.S. PATENT DOCUMENTS

| | | | |
|---|---|---|---|
| 4,874,963 | 10/1989 | Alspector | 307/201 |
| 4,897,811 | 1/1990 | Scofield | 364/900 |
| 5,003,490 | 3/1991 | Castelaz et al. | 364/513 |
| 5,247,303 | 9/1993 | Cornelius et al. | 342/26 |
| 5,467,428 | 11/1995 | Ulug | 395/23 |
| 5,729,662 | 3/1998 | Rozmus | 395/23 |
| 5,761,383 | 6/1998 | Engel et al. | 395/21 |

FOREIGN PATENT DOCUMENTS

| | | |
|---|---|---|
| 0747724 | 5/1996 | European Pat. Off. . |
| 19518993 | 12/1996 | Germany . |
| 9102323 | 2/1991 | WIPO . |

OTHER PUBLICATIONS

Radig, Bernd: "Mustererkennung 1991" 13. DAGM Symposium Munchen 9.–11 Okt. 1991, pp. 1–18.

"A Neural Network Approach to Doppler–Based Target Classification" by Madrid, et al. Universidad Politecnica de Madrid, Spain, pp. 450–453.

"An Automatic Ship Classification System for ISAR Imagery", SPIE vol. 2492 1995, pp. 373–388.

"The Cascade–Correlation Learning Architecture" by Fahlman et al, Aug. 29, 1991, School of Computer Science, Carnegie Mellon University, pp. 1–13.

*Primary Examiner*—John B. Sotomayor
*Attorney, Agent, or Firm*—Ware, Fressola, Van Der Sluys & Adolphson LLP

[57] ABSTRACT

Neural networks are used to classify objects automatically by means of Doppler-broadened radar echo signals. The classification device KK contains a neural network (NET, NET2) which has an input layer (IL) of input nodes (IN1, ..., IN57) for features (M) of the Doppler-broadened radar echo signals, and an output layer (OL) of output nodes (ON1, ON2, ON3) for predetermined classes to which the objects can be allocated. The neural network (NET, NET2) is adapted to the external conditions prevailing at the time of the classification operation. The adaptation takes place either via accessible input nodes (ZN1, ZN2) into which control information (SI) can be entered, and which cause the neural network (NET) to adapt to one or to several external influence factors, or via a selection device (SEL) which, from the parameters (P1, ..., P4) of several neural networks stored in a memory (MEM), which are trained with training data under respectively different conditions of external influence factors, selects the one most similar to the prevailing conditions.

11 Claims, 3 Drawing Sheets

DEVICE AND METHOD FOR CLASSIFYING
OBJECTS IN AN ENVIRONMENTALLY
ADAPTIVE MANNER

TECHNICAL FIELD

The invention concerns a device for the automatic classification of objects by means of Doppler-broadened radar echo signals with the use of a neural network.

BACKGROUND OF THE INVENTION

In the state of the art it is known to classify objects into target classes by means of Doppler-broadened radar echo signals. Neural networks are used for the classification. A device and a method for the automatic classification of objects, which uses a neural network of the multi-layer perceptron type with a layer of input nodes for features of the Doppler-broadened radar echo signals, with hidden layers and a layer of output nodes, is described in an essay by J. Martínez Madrid et al: "A Neural Network Approach to Doppler-Based Target Classification", Universidad Politécnica de Madrid, Spain, pages 450 to 453.

A device for classifying data that change with time, particularly for classifying objects by means of their time-dependent Doppler radar or sonar signatures is described in the international patent application WO 91/02323 (PCT/US90/04487). It is designed for processing two-dimensional data, namely of frequency bands and pertinent time slots. To that end it has a neural network with at least N+1 input nodes, with N as the number of frequency bands, and for classifying the object the value of a time slot and the associated values of the individual frequency bands are presented to the input nodes of the neural network.

A further method for classifying objects is known from an article by M. Menon entitled "An Automatic Ship Classification System for ISAR Imagery", SPIE Volume 2492 1995, pages 373 to 388. In that case ships are divided into classes by means of digitized video images of an ISAR radar device using a neural network of the adaptive clustering network type. Feature vectors of different video images are presented to the neural network.

The devices and methods for classifying objects known in the state of the art have the disadvantage that their reliability of classification assurance depends on environmental influences and, if other environmental influences prevail during the operating phase than during the determination of the training data, they have relatively high rates of wrong classifications.

SUMMARY OF THE INVENTION

The object of the invention is to present a device and a method for the automatic classification of objects which has a lower dependence on environmental influences than the state of the art.

The object is attained by a device for the automatic classification of objects by means of Doppler-broadened radar echo signals, which contains a neural network with an input layer of input nodes for features of the Doppler-broadened radar echo signals, and an output layer of output nodes for predetermined classes to which the objects can be allocated, wherein the neural network has at least one additional input node into which control information can be entered, which causes the neural network to adapt to one or to several external influence factors.

The object is also achieved by a device for automatically classifying objects by means of Doppler-broadened radar echo signals, which has a neural network with an input layer of input nodes for features of the Doppler-broadened radar echo signals, and an output layer of output nodes for predetermined classes to which the objects can be allocated, wherein a memory which stores parameters of several neural networks that were trained with training data under respectively different conditions of external influence factors, and a selection device which, as a function of external influence factors, selects the parameters of the neural network that was trained with training data under conditions of external influence factors which are most similar to the external conditions prevailing at the time the Doppler-broadened radar echo signals are received.

The object is still further attained by a method of automatically classifying objects by means of Doppler-broadened radar echo signals, in which the classification uses a neural network with output nodes for predetermined classes to which the objects can be allocated, features are determined from the Doppler-broadened radar echo signals and are presented to the neural network at input nodes of an input layer, and as a response to the features presented to the neural network, the output nodes exhibit an activation to determine the class to which the object being classified is to be allocated, wherein an adaptation of the neural network to at least one external influence factor is carried out, by determining a control information from the at least one external influence factor, which is entered into at least one additional input node of the neural network.

It is still further achieved by a method of automatically classifying objects by means of Doppler-broadened radar echo signals, in which the classification uses a neural network with output nodes for predetermined classes to which the objects can be allocated, features are determined from the Doppler-broadened radar echo signals and are presented to the neural network at input nodes of an input layer, and as a response to the features presented to the neural network, the output nodes exhibit an activation to determine the class to which the object being classified is to be allocated, wherein an adaptation of the neural network to at least one external influence factor is carried out, in that from a memory containing parameters of several neural networks that were trained with training data under respectively different conditions of external influence factors, the parameters which are most similar to the external conditions prevailing at the time the Doppler-broadened radar echo signals are received, are selected from the neural network which was trained with training data under conditions of external influence factors.

An advantage of the invention is that a higher classification rate than with the state of the art is attained.

BRIEF DESCRIPTION OF THE DRAWINGS

The invention is explained in the following by means of two embodiments and FIGS. 1 to 4, where.

BEST MODE FOR CARRYING OUT THE INVENTION

Figure 1:
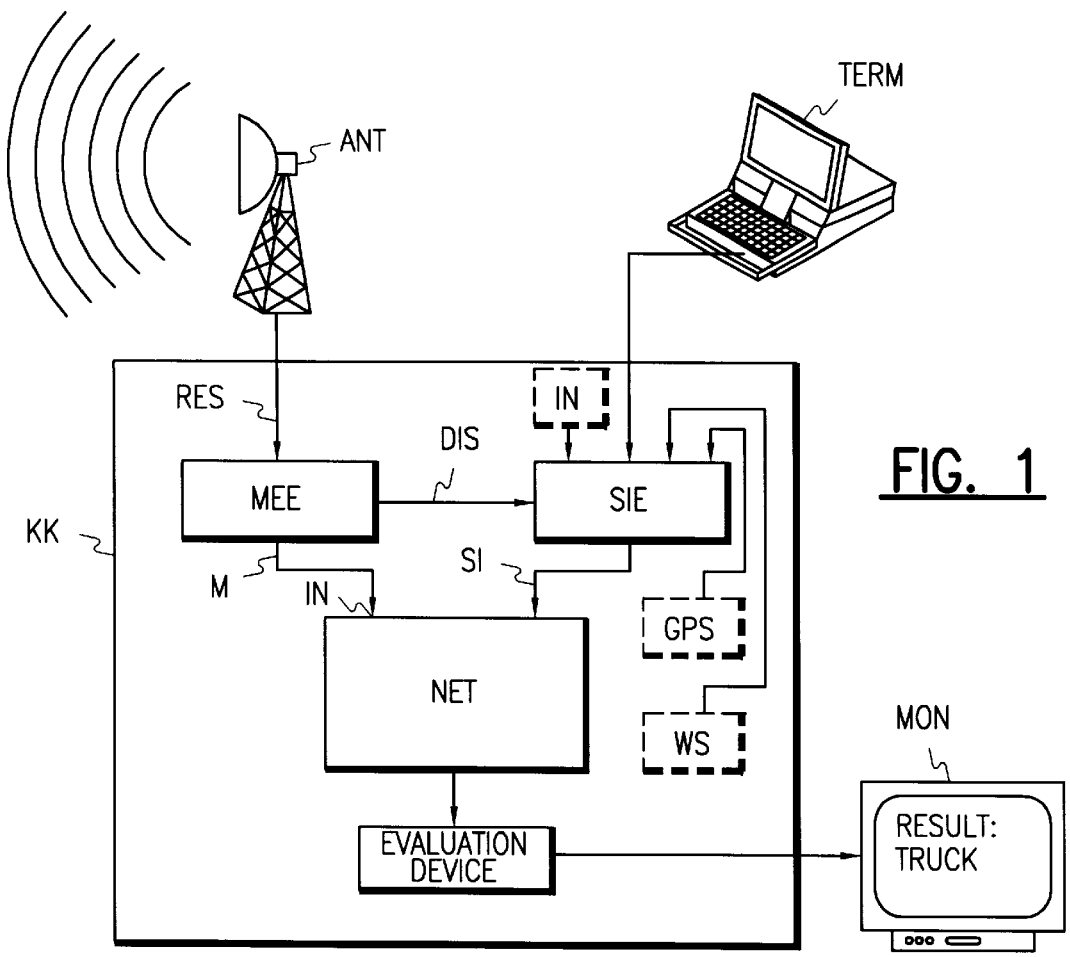
FIG. 1 is a block diagram of a device according to the invention.

The invention is based on the classification of objects by means of Doppler-broadened radar echo signals. Emitted radar echo signals are reflected by a moving object which is to be classified. The Doppler effect shifts and broadens the frequency of the emitted radar echo signal. While the frequency shift is characteristic for the radial velocity of the object from the radar transmitter, the spectral broadening is characteristic of internal movements of the object, such as vibrations caused by a driving mechanism for example, or the rotation of a propeller or a drive shaft. The characteristic spectral broadening of an object is called a Doppler signal and, with the proper selection of the radar frequency, produces an acoustic sound signal as the difference between the reflected and the emitted radar echo signal. In this connection the classification of an object means that an object is recognized and allocated to a certain class from a series of predetermined object classes. The classification takes place with the use of a neural network.

A neural network comprises nodes and synaptic connections between the nodes. Weights which are determined by training with training data are allocated to the synaptic connections. The nodes indicate an activity as the result of input data. The neural network is subdivided into different hierarchical layers, where every node of a lower layer is connected to every node of a higher layer through synaptic connections. A neural network with such a topology is called a multi-layer perceptron. The input data for the nodes is the activation of the nodes in the next lower layer, multiplied by the weight of the respective synaptic connection. The result is the activation $y_n$ of a node $N_n$ in accordance with a formula of the type:

$$y_n = f\left(\sum_i w_{in} x_i\right)$$

where f( ) is a predetermined function, $x_i$ is the activation of the ith node $N_i$, and win is the weight of the synaptic connection between the ith node $N_i$ and the nth node $N_n$. The input data of the lowest layer, called the input layer, are features of the Doppler-broadened radar echo signals, and the classification result is determined from the activation of the nodes in the uppermost layer called the output layer. The greatest probability is that an object belongs to the class whose output node exhibits the highest activation.

A classification through the neural network takes place in that classification results stored in the past are used to make conclusions about future ones. To that end the network learns with training data from different objects of all classes. In this case the training data are presented to the neural network often enough, until the network has learned to allocate all training data correctly by varying the weights of the synaptic connections. The training takes place in accordance with an algorithm, such as for example the error-back-propagation algorithm described in the essay by J. Martínez Madrid et al: "A Neural Network Approach to Doppler-Based Target Classification", Universidad Politécnica de Madrid, Spain, pages 450 to 453. During the training all the output nodes were trained by themselves, i.e. the neural network was trained with training data from every class of objects belonging to the respective class, until the network was able to allocate all the training data to the right class. The weights of the synaptic connections, which were determined once through training, can be read out after the training to reproduce the topology of the network any number of times. Therefore not every individual device requires training.

Another training possibility is to use the algorithm for cascade-correlated networks described in "The Cascade-Correlation Learning Architecture" by Scott I. Fahlman and Christian Lebiere, Aug. 29, 1991, School of Computer Science, Carnegie Mellon University, Pittsburgh, Pa. 15213. According to this method the neural network is produced during the training, i.e. the training establishes both the weights of the synaptic connections as well as the topology of the network.

The training and thus above all the training data being used determine the weights of the synaptic connections. However, Doppler-broadened radar echo signals not only depend on the object by which they are reflected, but also on external influence factors. Such external influence factors are environmental influences for example, such as:

weather, precipitation, fog, atmospheric humidity, vegetation and its movement due to wind, surface utilization and rough seas and operative influences such as:

the position, the observation angle (elevation and azimuth)

the observation time (average duration)

the distance to the object to be classified and its movement parameters (direction, angle, change in direction and angle, velocity).

Since it is not possible to train the neural network with training data from all possible environmental conditions, and all possible combinations of different influence factors with different conditions, a basic idea of the invention is for the classification to use a neural network which is adapted to the conditions prevailing at the time the Doppler-shifted radar echo signals are determined.

One aspect of the invention is to perform an adaptation of the neural network through control information which is entered at additional input nodes of the neural network, and to adapt the neural network to one or several external influence factors. During the learning phase the neural network was trained with training data which, in addition to features of Doppler-broadened radar echo signals, also contained control information about pertinent environmental influences, i.e. the external conditions of predetermined influence factors.

Another aspect of the invention is to provide the device with a memory which contains parameters of several neural networks. The several neural networks are trained with training data under respectively different external conditions. The classification is made with a neural network that was trained with training data under the external conditions that are most similar to the external conditions prevailing at the time the Doppler-broadened radar echo signals are received. The parameters can be the weights of the synaptic connections for example, which were obtained during several learning phases with training data under different external conditions.

A first embodiment of a classification device KK of the invention is illustrated in a block diagram of FIG. 1. It contains a feature extraction device MEE, whose input is connected to a radar antenna ANT. The radar antenna emits short radar pulses and receives the radar echo signals RSE reflected by an object to be classified. The feature extraction device MEE derives features M from the radar echo signals RSE, and presents these features M to the inputs IN of a neural network NET. The neural network has additional inputs ZN which are connected to the output of a control device SIE. The control device SIE generates control information SI which causes the neural network NET to adapt to at least one external influence factor.

The first embodiment includes a connection DIS between the feature extraction device MEE and the control device SIE, whereby the feature extraction device MEE informs the control device SIE about the distance from which the radar echo signal RES was reflected. The feature extraction device determines this information from the running time of the radar pulse. The distance represents a first external influence factor to which the neural network NET is adapted by the control device SIE, using a first control information SI.

A second external influence factor can be input by a user through a terminal TERM connected to the control device SIE. In the first embodiment, a user enters the observation angle of the radar antenna ANT. The observation angle determines the azimuthal angle from which the radar antenna ANT monitors an observation sector. For example the radar antenna ANT can be installed on an elevation, a mountain or a cliff, and monitor a lower plane. In that case the user has to indicate the relative altitude above the plane (elevation), and the control device SIE can then compute the azimuthal angle from the relative height and the distance from an observation sector. From these indications the control device SIE generates a second control information and routes it to an additional input of the neural network NET.

The outputs of the neural network NET are connected to an evaluation unit AUS, which evaluates the activation of the output nodes of the neural network NET, determines the class to which an object being classified is to be allocated, and routes the result for further processing, for example to an output unit MON. In the first embodiment the output unit MON is a monitor which displays the classification result. The classification device KK of the first embodiment is designed for the allocation of motor vehicles into passenger vehicle (PKW) and truck (LKW) classes, for example to monitor traffic, and in the drawing has just recognized an LKW.

In a further development of the invention, the classification device KK is integrated into a GPS (Global Positioning System) receiver. It is able to determine the exact position of the classification device KK by means of satellite tracking, and to establish the elevation and observation angle. In this case the user input via a terminal TERM required in the first embodiment, can be omitted. This produces advantages, particularly with frequent changes in the positions of portable installations.

In another advantageous configuration of the invention, a weather station WS is integrated into the classification device KK, which is able to measure wind speed, atmospheric humidity, fog and precipitation for example and route them to the control device SIE. The latter thus generates further control information SI for the neural network NET. The assurance and the rate of the classification device KK are increased by adapting the neural network to further external influence factors.

Particularly preferred is a configuration of the invention wherein the classification device KK includes an interface device IN. This interface device IN is used to provide more information about external influence factors to the control device SIE, for example about weather conditions or rough seas. The interface device IN can include an air interface for radio transmission or even a line interface, and be connected to a remote information source such as the ocean meteorology department or a remote weather station for example.

The interface device IN is particularly suited for the input of environmental influences such as weather, precipitation, fog, atmospheric humidity, vegetation (woodlands) and their movement caused by wind, surface utilization and rough seas. In this way operative influences such as the position, the observation angle (elevation and azimuth), the observation time (average duration), the distance to the object being classified and its movement parameters (direction, angle, change in the direction and angle, velocity) can be determined by the classification device KK. For example the average duration is known from the device's type of operation, the velocity and distance of an object can be determined from the reflected Doppler-broadened radar echo signals, and the above described GPS receiver can determine its position.

In addition to the external influence factors of distance and observation angle used in the first embodiment, an adaptation of the neural network to other external influence factors via further additional input nodes is advantageous, and leads to better classification results depending on the type of usage of the classification device.

Figure 2:
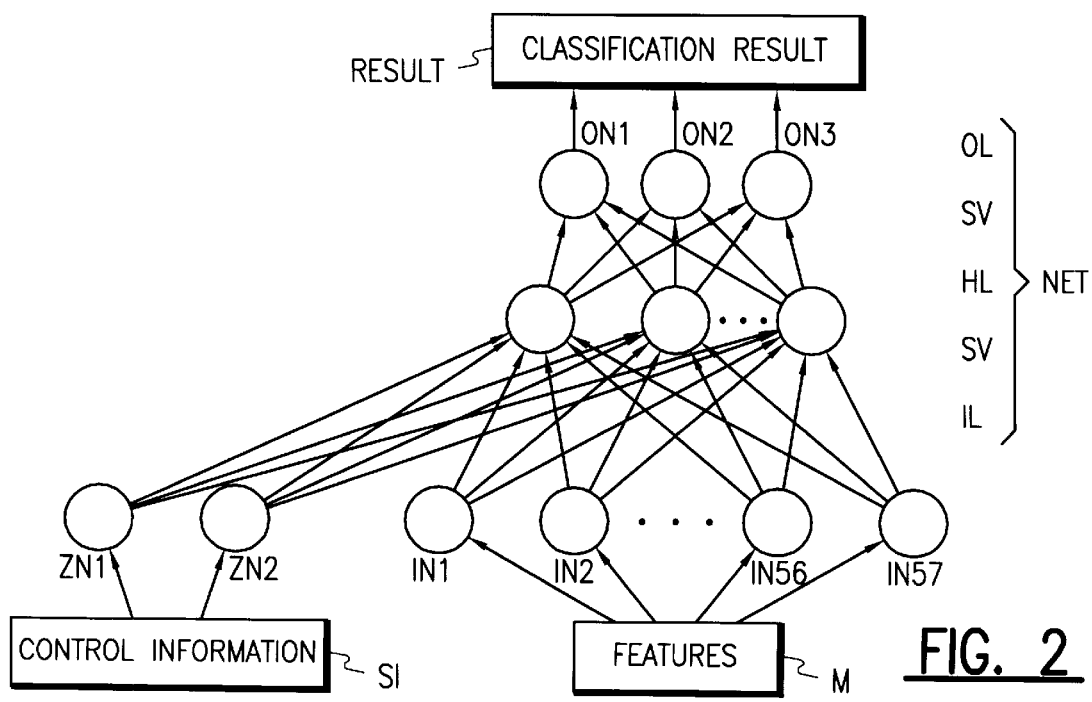
FIG. 2 is a schematic illustration of a neural network.

FIG. 2 illustrates the neural network NET of the first embodiment. In that case the neural network NET comprises an input layer IL of 57 input nodes IN1, . . . , IN57 for the features M of the Doppler-broadened radar echo signals, an intermediate layer HL of 30 nodes, an output layer OL of three output nodes ON1, ON2, ON3 for the classes LKW, PKW and bicycles to which objects can be allocated, and two additional input nodes ZN1, ZN2 belonging to the input layer IL, for the control information SI. Every node of a lower layer is connected to every node of a higher layer via synaptic connections SV. If a classification takes place, it means that an object was recognized by means of a Doppler-broadened radar echo signal, and was allocated to one of the three classes LKW, PKW or bicycles. The allocation is made to the output node class with the highest activation.

The control information SI generated by the control device SIE is presented to the two additional input nodes ZN1, ZN2. The two additional input nodes ZN1, ZN2 affect the activation of all nodes of the intermediate layer HL via the synaptic connections SV, and indirectly therefore the activation of the three output nodes ON1, ON2, ON3. In this way they determine the classification result ERG, which is actually determined by the activation of the output nodes. The weights of the individual synaptic connections SV were determined during a training and advantageously cannot be changed after the training is completed. If it was possible to also change the weights during operation, the neural network NET would have to be constantly monitored during operation, and the danger would exist of learning wrong recognition patterns due to an inadequate effect of a user on the neural network NET's continuing learning process.

To achieve a good adaptation to external influence factors, the neural network NET is trained with test data under different external conditions, and during this learning phase the neural network NET is also presented with the control information SI of the training data. However this does not require learning the training data from all possible external conditions and combinations of external influence factors. Rather it is sufficient to train the neural network NET with a few selected values of the different external influence factors, so-called support points. For the external influence factor of atmospheric humidity, this means for example that training data are not needed from all possible atmospheric humidity conditions, rather it is sufficient to train the neural network NET with 0%, 50% and 100% of training data. The effect of the intermediate values can be interpolated by the neural network NET.

The required training data can either be determined from different external conditions to be learned, or the effect of predetermined external influence factors on the Doppler-broadened radar echo signals can be simulated by using models. This is particularly easy to realize for influence magnitudes such as distance, atmospheric humidity or precipitation which above all affect the attenuation of the signal. The special advantage of this configuration of the invention is therefore that the neural network needs not to be trained with training data from all possible external conditions or combinations, but that the neural network only needs to learn a few support points, where the effect of external influence factors can also be simulated. This utilizes the ability of neural networks to interpolate between such support points.

Figure 3:
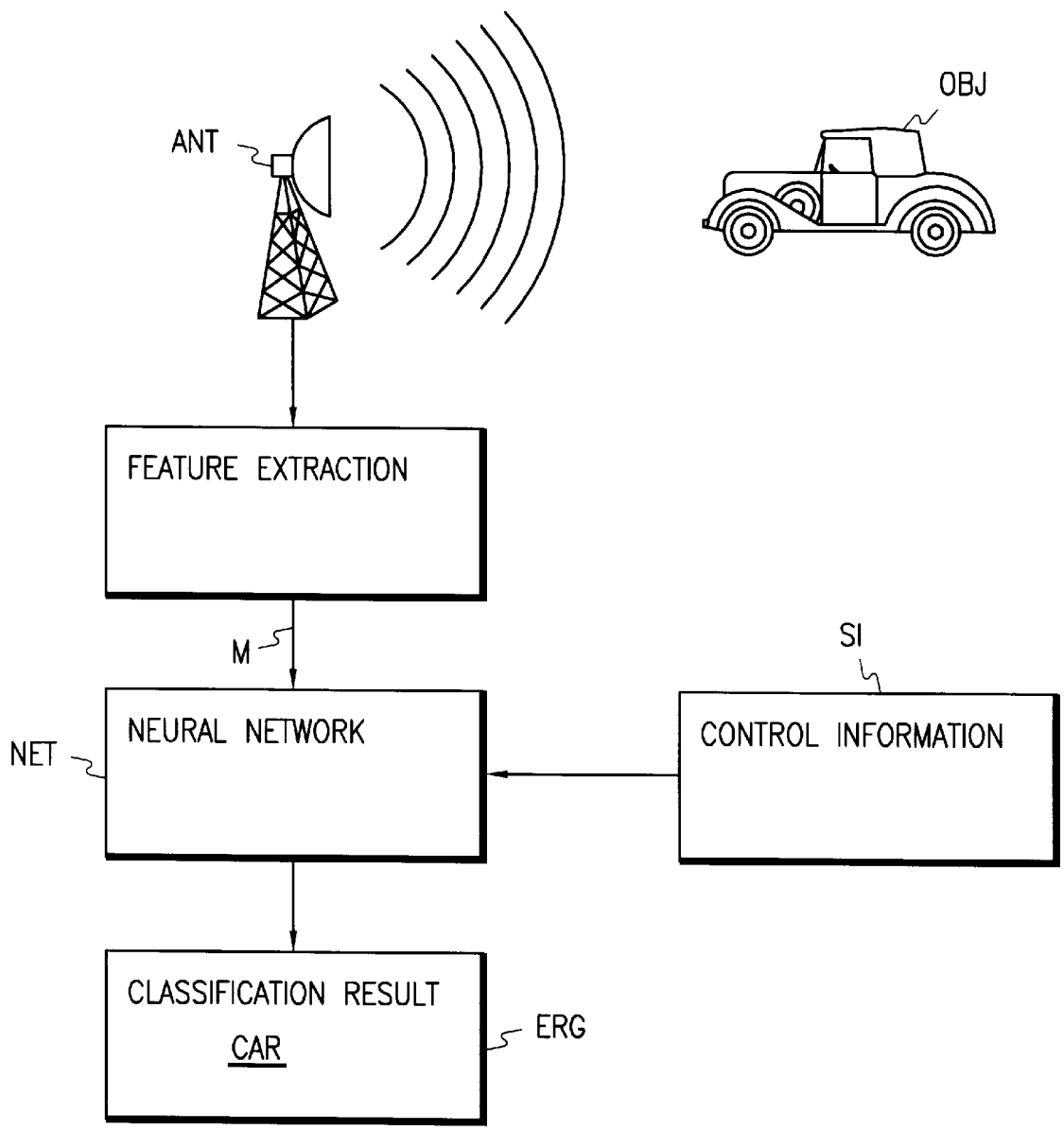
FIG. 3 is a flow diagram of a method according to the invention.

In the embodiment, the classification evolves in accordance with the method illustrated in FIG. 3. First a radar measurement is taken. To that end the radar antenna ANT emits a sequence of short radar signals at a pulse frequency rate of 4 kHz for example, and a transmitting frequency in the range of 10 GHz for example, and after a certain (running) time the radar antenna ANT receives a reflected Doppler-broadened radar echo signal. The construction of the radar antenna establishes an angular range from which the reflected radar signal can be received.

This is followed by the feature extraction: a demodulation removes the carrier frequency of the emitted radar signal from the received Doppler-broadened radar echo signal. The result is a time spectrum which is called a video signal with a pulse period that corresponds to the pulse frequency rate of the emitted radar signals. The video signal within each pulse period is divided into a number of time windows which are representative of a predetermined average distance as a function of the running time. The number of time windows corresponds to a distance resolution and depends on the pulse duration of the emitted radar signals.

For each time window a sequence of values is formed, which are received in consecutive pulse periods as an average sampling value at the same sampling time. The sequence represents an acoustic sound signal which is sampled with the pulse frequency of the emitted radar signals and is called a Doppler signal. The number of signal values of the Doppler signal depends on the observation time and is 256 in the embodiment. The frequency range of the Doppler signal is determined by the transmitting frequency of the radar signals and is proportional thereto. The frequency range is around 0 to 2 kHz in the embodiment. The angular range of the radar antenna ANT and the average distance of the respective time windows divides a predetermined observation space into observation sections, and by rotating the radar antenna ANT a Doppler signal is received from each observation section.

The 256 signal values of a Doppler signal are mapped into the frequency range with the help of a discrete Fourier transformation, for example the FFT (Fast Fourier Transformation). The display takes place via 256 amount coefficients. Since the transformed spectrum is symmetrical, only half of the amount coefficients must be considered, i.e. 129 including the zero position. They are squared, logarithmized and subsequently mapped into 128 coefficients with the help of an inverse Fourier transformation. Such a display is called a cepstrum and the coefficients are called cepstral coefficients. The display of the Doppler signal as a cepstrum is advantageous because this display makes possible a particularly reliable classification while using a neural network.

The first 57 cepstral coefficients are now presented to the neural network as input data in 57 input nodes IN1, . . . , IN57. The cepstral coefficients 58 to 128 of the first embodiment receive no further consideration because 57 coefficients are sufficient for a reliable classification. It may however be useful to consider a larger number of cepstral coefficients in order to recognize and classify other objects, for example airplanes or ships.

The control information SI, which is generated by the control device SIE, is also presented to the neural network NET, namely at the additional input nodes ZN1, ZN2 provided to that end. In the first embodiment, the first control information for the distance from which the Doppler-broadened radar echo signal was reflected is presented to the neural network NET at the first additional input node ZN1, and the second control information for the observation angle of the radar antenna ANT is presented at the second input node ZN2. As a reaction to the input data, the output nodes exhibit activations, and the class to which the object OBJ being classified is to be allocated is determined from these activations. In the present case the second output node ON2, which was trained for passenger vehicles (PKW), exhibits the highest activation and the object OBJ is recognized and classified as a PKW (classification result ERG).

Figure 4:
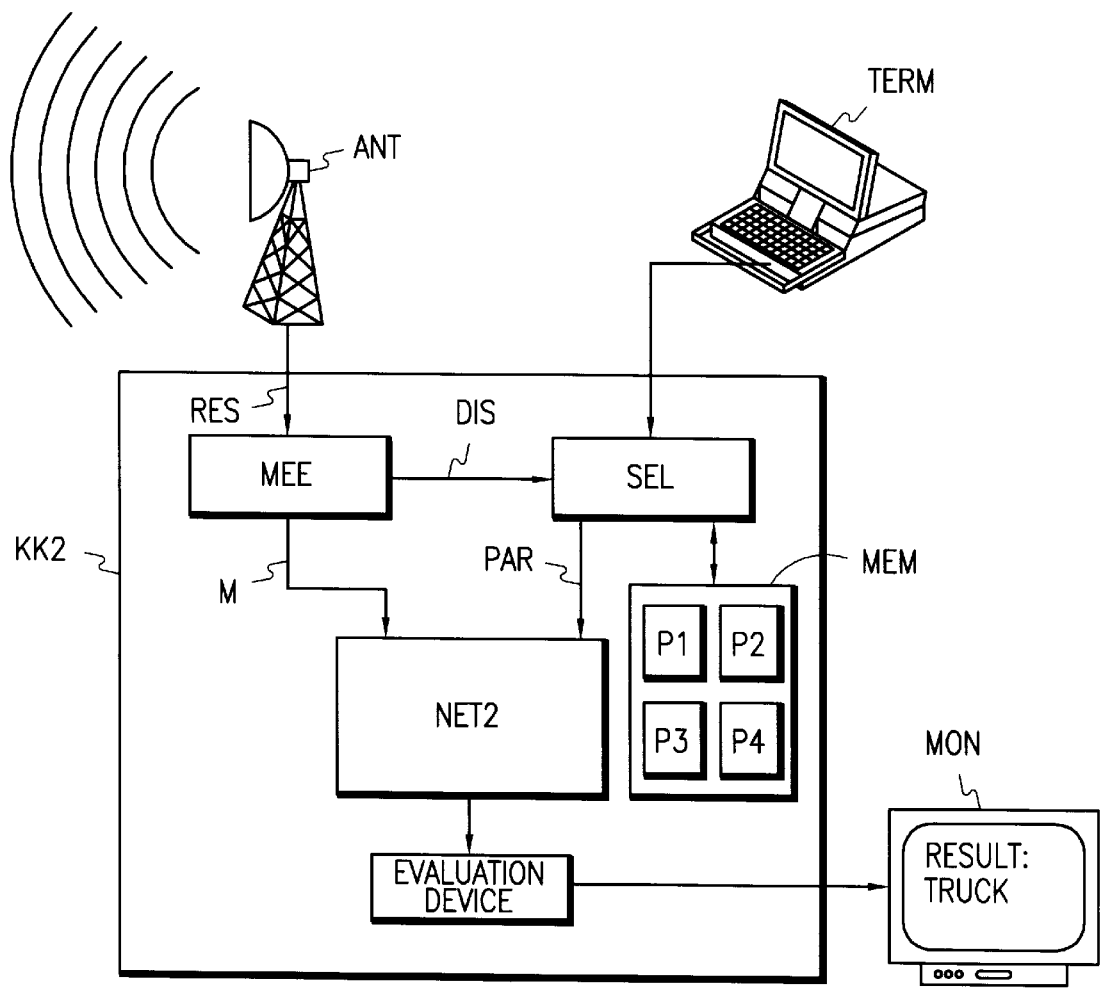
FIG. 4 is a further device in a block diagram.

Another classification device KK2 of the invention, which also uses a neural network NET2 that was adapted to external conditions, is contained in a second embodiment shown as a block diagram in FIG. 4. Similar elements have the same references as in FIG. 1.

The classification device KK2 of the second embodiment contains:
 the feature extraction device MEE which is connected to a radar antenna ANT;
 the neural network NET2 which has the same topology as the neural network NET of the first embodiment;
 the evaluation device AUS connected to the monitor MON;
 a selection device SEL and
 a memory MEM.

The memory MEM stores the parameters of several neural networks. These are four sets of parameters P1–P4 belonging to four neural networks, which differ in that they are trained with training data under different external conditions.

The sets of parameters contain the weights of the individual synaptic connections SV for the neural network NET2. The parameters are produced because the neural network NET2 was trained with four sets of training data containing Doppler-broadened radar echo signals under different conditions of external influence factors.

In the second embodiment these are the same influence factors as in the first embodiment: the distance of an object and the observation angle. The sets of training data contain training data with the possible combinations of the following external conditions:
 distance of the object $\leq 1$ km
 distance of the object $>1$ km
 the observation angle lies in the interval from +2 degrees to −2 degrees from the horizontal
 the observation angle lies outside of this interval.

The selection device considers the external conditions prevailing at the time of the classification operation, which it receives from the feature extraction device MEE (distance of the object) and from the terminal TERM (elevation) via the connection DIS, and with this information selects from the memory MEM the set of parameters with the most similar external conditions. The individual weights contained in the selected set of parameters are loaded into the neural network NET2 as new weights of the synaptic connections SV. These new weights are used to perform a classification and the result is displayed on the monitor MON.

Instead of the sets of parameters P1–P4, the memory MEM can also store the entire topologies of different neural networks. This is especially necessary if instead of a multi-layer perceptron network, as in the embodiments, a neural network of the cascade-correlated networks type described in the beginning, whose topology is only determined by the training, is used for the classification.

This second configuration as well has advantageous further developments of the invention, by integrating a GPS receiver or a weather station into the classification device KK2, or providing an interface device for receiving information about external conditions from a remote information source. The two alternative configurations described in the two embodiments can also be combined to advantage.

In both embodiments the neural network comprises three layers, where in each case a hidden layer is placed between the input layer and the output layer. The use of two or more hidden layers can also be envisioned. However, this would increase the calculation effort which is required to compute the activation of the individual layer nodes, without gaining significantly better classification results with a topology of more than one hidden layer. The use of a neural network with three layers is therefore preferred.

In the device of the invention, the neural network can be configured with cross-linked microprocessors operating in parallel. A possible alternative is a configuration with only one microprocessor which operates the individual nodes of the network sequentially. In this case the neural network is developed with a program module stored in a memory.

What is claimed is:

1. A device for the automatic classification of an object by means of Doppler-broadened radar echo signals reflected by the object and received by a radar receiver, the device including a neural network (NET) with an input layer (IL) of input nodes (IN1, . . . , IN57) for inputting features (M) of the Doppler-broadened radar echo signals, and an output layer (OL) of output nodes (ON1, ON2, ON3) each corresponding to a class in a predetermined group of classes into one of which the object can be allocated, characterized in that the neural network (NET) has at least one additional input node (ZN1, ZN2) into which control information (SI) can be entered, for causing the neural network (NET) to adapt to an external influence factor.

2. A device as claimed in claim 1, wherein the control information is the position and/or the observation angle of the radar receiver.

3. A device as claimed in claim 2, further comprising a GPS (Global Positioning System) receiver for obtaining information about the position and/or the observation angle of the radar receiver that receives the Doppler-broadened radar echo signals.

4. A device as claimed in claim 1, wherein the control information indicates weather conditions at the time when the Doppler-broadened radar echo signals arrive at the receiver.

5. A device as claimed in claim 4, further comprising a weather station for obtaining information about the weather at the time the Doppler-broadened radar echo signals are received.

6. A device as claimed in claim 1, wherein the control information indicates the distance of the object from the radar receiver.

7. A device as claimed in claim 1, further comprising an interface device (IN) for receiving information about external influences from a spatially separated information source.

8. A device as claimed in claim 1, further comprising an input device (TERM) whereby a user is able to enter information about external influence factors.

9. A device for automatically classifying objects by means of Doppler-broadened radar echo signals, the device including a neural network (NET) having an input layer (IL) of input nodes (IN1, . . . , IN57) each for inputting a feature (M) of the Doppler-broadened radar echo signals, and an output layer (OL) of output nodes (ON1, ON2, ON3) for allocating the object to a class in a predetermined set of classes, characterized in that the device further comprises:

a memory (MEM) for storing a plurality of parameter sets for use with the neural network, each parameter set determined from training under different sets of conditions of external influence factors, each parameter set corresponding to a set of conditions of external influence factors, and a selection device (SEL) for selecting, as a function of external influence factors, one parameter set from the plurality of parameter sets.

10. A method of automatically classifying an object by means of Doppler-broadened radar echo signals reflected from the object, in which features (M) are determined from the Doppler-broadened radar echo signals and are presented to a neural network (NET) at input nodes (IN1, . . . , IN57) of an input layer (IL) of the neural network, and as a response to the features (M) presented to the neural network (NET), the neural network activates output nodes (ON1, ON2, ON3) to classify the object, characterized in that an adaptation of the neural network (NET) to at least one external influence factor is carried out, by determining a control information (SI) value corresponding to the at least one external influence factor, which is entered into an additional input node (ZN1, ZN2) of the neural network (NET).

11. The method as claimed in claim 10, further characterized in that from a memory (MEM) containing parameter sets (P1, . . . , P4) each from training under different sets of conditions of external influence factors, the parameter set is selected corresponding to external conditions most similar to the external conditions prevailing at the time the Doppler-broadened radar echo signals are received.

\* \* \* \* \*